United States Patent
Simmons (10) Patent No.: US 10,161,431 B2
(45) Date of Patent: Dec. 25, 2018

(54) NET POLE LATCH MECHANISM

(71) Applicant: CNH Industrial America LLC, New Holland, PA (US)

(72) Inventor: Scott C. Simmons, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 550 days.

(21) Appl. No.: 14/845,852

(22) Filed: Sep. 4, 2015

(65) Prior Publication Data

US 2017/0067495 A1  Mar. 9, 2017

(51) Int. Cl.
*F16B 9/02* (2006.01)
*A01F 15/08* (2006.01)
*A01F 15/07* (2006.01)

(52) U.S. Cl.
CPC .......... *F16B 9/023* (2013.01); *A01F 15/0715* (2013.01)

(58) Field of Classification Search
CPC ....... A01F 15/0715; A01F 15/08; F16B 9/023
USPC ..... 53/399, 118, 116, 587, 389.4; 100/5, 34; 56/341; 242/422.4
See application file for complete search history.

(56) References Cited

U.S. PATENT DOCUMENTS

| | | | |
|---|---|---|---|
| 5,996,307 A | 12/1999 | Niemerg et al. | |
| 6,272,816 B1 | 8/2001 | Viaud et al. | |
| 6,295,797 B1 | 10/2001 | Naaktgeboren et al. | |
| 6,644,006 B1 | 11/2003 | Merritt et al. | |
| 6,688,092 B2 | 2/2004 | Anstey et al. | |
| 6,823,646 B2 * | 11/2004 | McClure | A01F 15/0715 100/5 |
| 6,877,304 B1 | 4/2005 | Smith et al. | |
| 7,322,167 B2 | 1/2008 | Chapon et al. | |
| 2013/0305683 A1 | 11/2013 | Ziembicki | |
| 2014/0261021 A1 | 9/2014 | Smith et al. | |

FOREIGN PATENT DOCUMENTS

EP   2596697 A1   5/2013

OTHER PUBLICATIONS

European Search Report; 161872163-1656; dated Jan. 11, 2017.

\* cited by examiner

*Primary Examiner* — Thanh Truong
*Assistant Examiner* — Xavier A Madison
(74) *Attorney, Agent, or Firm* — Patrick M. Sheldrake (57) ABSTRACT

The disclosure relates to a wrapping material system in a harvester, particularly to a latching mechanism that allows a material support cylinder to be unlocked and automatically ejected from its locked position. The latching mechanism comprises a support plate, connected to a harvester sidewall and configured for supporting the material support cylinder, and a lever plate, connected to the support plate at a pivot point and configured for locking in the material support cylinder in a closed position and ejecting the material support cylinder from the locked position when moved to an open position.

21 Claims, 8 Drawing Sheets

NET POLE LATCH MECHANISM

TECHNOLOGY FIELD

The present invention relates generally to a wrapping material system in a harvester, particularly to a latching mechanism that allows a material support cylinder to be unlocked and automatically ejected from its locked position.

BACKGROUND

For many years agricultural balers have been used to consolidate and package crop material to facilitate the storage and handling of the crop material for later use. Usually, a mower-conditioner cuts and conditions the crop material for windrow drying in the sun. When the cut crop material is properly dried, a baler, for example a round baler, travels along the windrows to pick up the crop material and form it into cylindrically-shaped round bales.

More specifically, the cut crop material is gathered at the front of the baler from along the ground, onto a pickup assembly, and introduced into a bale-forming chamber within the baler. Inside the cut crop is rolled up into a predetermined size. A conventional bale chamber may include a pair of opposing sidewalls with a series of belts, chains, and/or rolls that rotate and compress the crop material in to the cylindrically-shaped round bale. When the predetermined size is achieved, the cylindrically-shaped round bale is wrapped and bound by wrapping material, such as net wrapping, plastic wrapping, and/or wire. After the round bale is wrapped, the back of the baler, or tailgate, opens and the wrapped bale is discharged.

Wrapping material is fed into the baler off a wrapping material roll and into a wrapping mechanism, conventionally located in the front of the baler. As the baler forms, bounds, and distributes the bale, wrapping material is depleted until the roll needs to be replaced by a spare. Typically, one or two spare wrapping material rolls are stored on the baler, usually housed at the rear of the baler at the tailgate. When a roll of wrapping material needs to be replaced, the operator unlocks the material support cylinder on which the roll rests, manually swings the material support cylinder to a load/unload position, discards the depleted roll, walks to the back of the baler to acquire a stored roll, then walks the stored roll to the front of the baler, and installs the new roll. Wrapping material roll length typically measures 122 to 130 centimeters (48 to 51 inches) in length and between 30 and 45 kilograms (70 to 100 pounds) in weight. The material support cylinder itself can be 4 to 5 heel off the ground. The process of unlocking the material support cylinder and then pulling it away from the wrapping mechanism to its load/unload position must be down with care. Thus, it is desireable to minimize operator effort and maximize operator saftey when replacing a roll of wrapping material.

The instant application provides a system that allows an operator to easily release a material support cylinder from its locked position. By the activation of a lever, the material support cylinder is both unlocked and pushed toward its load/unload position without further operator interaction.

SUMMARY

The disclosure relates to a lever plate system comprising: a support plate, operably connected to a harvester sidewall, comprising a support notch configured for support of a material support cylinder; a lever plate, configured for at least two open positions and at least one closed position and operably attached to the support plate at a first pivot point, comprising a blocker section and a pusher section; wherein the blocker section of the lever plate occludes at least a portion of the support notch in a closed position and exposes at least a portion of the support notch in at least a first open position; and wherein the support notch is free of at least a portion of the pusher section in the closed position and occupied by at least a portion of the support notch in at least a second open position; and a spring, operably connected to the lever plate and the harvester sidewall.

In some embodiments, an edge of the pusher section of the lever plate is defined by a concave curvature, such concave curvature contacting the material support cylinder in the support notch when the lever plate is in the at least one closed position. In some embodiments, in the material support cylinder pivots away from the support notch when the lever plate transitions from a closed position to at least one open position. In some embodiments, the spring maintains tension between the lever plate and the harvester sidewall, such that the lever plate is biased toward the closed position.

In some embodiments, the lever plate further comprises a handle, configured to allow an operator to adjust the lever plate from a closed position to one or a plurality of open positions. In some embodiments, the lever plate further comprises a stop notch; and wherein the support plate further comprises a stop tab configured to occupy at least a portion of the stop notch, such that the stop tab limits a maximum range of motion of the lever plate. In some embodiments, the stop notch is positioned on the bottom edge of the lever plate.

In some embodiments, the lever plate system is configured for occluding in one or more closed positions and exposing the support notch in one or more open positions, such lever plate system comprising: a closed position in which the blocker section of the lever plate occludes the opening in the support notch, such that the material support cylinder contained in the support notch is prevented from pivoting away from the support plate; a first open position in which the blocker section of the lever plate exposes the opening in the support notch, such that the material support cylinder contained in the support notch is capable of pivoting away from the support plate; and a second open position in which the blocker section of the lever plate exposes the opening in the support notch and the pusher section of the lever plate occupies a position in the support notch, such that a material support cylinder pivots away from the support plate.

The disclosure also relates to a harvester comprising: at least one bale chamber; a pair of oppositely positioned sidewalls defining lateral sides of the at least one bale chamber; a wrapping mechanism comprising at least one material support cylinder positioned within or proximate to the at least one bale chamber; and a lever plate system, positioned adjacent to the wrapping mechanism and configured for operation in at least one closed position and at least two open positions, such lever plate system comprising: at least one support plate, operably connected to at least one sidewall, comprising a support notch positioned at or approximately at the forward edge of the support plate, capable of supporting the at least one material support cylinder; a lever plate, configured for at least two open positions and at least one closed position and operably attached to the support plate at a first pivot point, comprising a blocker section and a pusher section; wherein the blocker section of the lever plate occludes at least a portion of the support notch in a closed position and exposes at least a portion of the support notch in at least a first open position; and wherein the support notch is free of at least a portion of the pusher section in the closed position and occupied by at least a portion of the support notch in at least a second open position; and at least one spring, operably connected to the at least one lever plate and the at least one sidewall.

In some embodiments, an edge of the pusher section of the lever plate is defined by a concave curvature, such concave curvature contacting the material support cylinder in the support notch when the lever plate is in the at least one closed position. In some embodiments, the material support cylinder pivots away from the support notch when the lever plate transitions from a closed position to at least one open position. In some embodiments, the at least one spring maintains tension between the at least one lever plate and the at least one sidewall, such that the at least one lever plate is biased to the closed position.

In some embodiments, the at least one lever plate further comprises a handle, configured to allow an operator to move the at least one lever plate from the closed to at least the second open position. In some embodiments, the at least one lever plate further comprises a stop notch; and wherein the at least one support plate further comprises a stop tab, configured to occupy a position in the stop notch, such that the stop tab limits the maximum range of motion of the at least one lever plate.

In some embodiments, the harvester is configured for occluding in one or more closed positions and exposing the support notch in one or more open positions, such lever plate system comprising: a closed position in which the blocker section of the lever plate occludes the opening in the support notch, such that the material support cylinder contained in the support notch is prevented from pivoting away from the support plate; a first open position in which the blocker section of the lever plate exposes the opening in the support notch, such that the material support cylinder contained in the support notch is capable of pivoting away from the support plate; and a second open position in which the blocker section of the lever plate exposes the opening in the support notch and the pusher section of the lever plate occupies a position in the support notch, such that a material support cylinder pivots away from the support plate.

In some embodiments, the lever plate further comprises a handle, positioned at or approximately at the upper rear section of the lever plate, configured to allow an operator to move the lever plate from the closed to at least the second open position; wherein the level plate further comprises a stop notch, positioned on the bottom edge of the lever plate; and wherein the at least one support plate further comprises a stop tab comprising a front wall and a rear wall, positioned at the bottom of the support plate, configured to occupy a position in the stop notch in both the closed and open positions, such that the stop tab limits the maximum range of motion of the at least one lever plate by coming in operable contact with the front wall in the at least second open position and by coming in operable contact with the rear wall in the at least one closed position.

In some embodiments, the lever plate system is configured for occluding and exposing the opening in the support notch in a plurality of positions comprising: a closed position whereby the blocker section of the lever plate occludes the opening in the support notch and the pusher section of the lever plate does not occupy a position in the support notch, such that a material support cylinder contained in the support notch is prevented from pivoting away from the support plate; a first open position whereby the blocker section of the lever plate exposes the opening in the support notch and the pusher section of the lever plate does not occupy a position in the support notch, such that a material support cylinder contained in the support notch is not prevented from pivoting away from the support plate; and a second open position whereby the blocker section of the lever plate exposes the opening in the support notch and the pusher section of the lever plate occupies a position in the support notch, such that a material support cylinder pivots away from the support plate.

The disclosure also relates to a method of moving a material support cylinder from a locked position to a load position in any harvester disclosed herein, the method comprising adjusting the position of the lever plate from a closed position to a fully open position. In some embodiments, the step of adjusting the position of the lever plate comprises moving the handle radially from its position in the closed position.

The disclosure also relates to method of reloading wrap material in any harvester disclosed herein, said method comprising: (a) adjusting the position of the lever plate from a closed position to an open position; (b) disengaging the stop tab from the support notch; (c) allowing the material support cylinder to pivot away from the support plate; (d) removing wrapping material from the material support cylinder; and (e) placing a new roll of wrapping material on the material support cylinder. In some embodiments, the method further comprises adjusting the position of the lever support plate from at least a first open position to a closed position after the step of placing a new roll of wrapping material on the material support cylinder such that, in the closed position, the material support cylinder is positioned within the support notch.

DETAILED DESCRIPTION OF THE DISCLOSURE

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g. 3, 4, or 5.

The term "plurality" as used herein is defined as any amount or number greater or more than 1.

The terms "left" or "right" are used herein as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes.

The term "about" as used herein when referring to a measurable value such as an amount, a temporal duration, and the like, is meant to encompass variations of ±20%, ±10%, ±5%, ±4%, ±3%, ±2%, ±1%, ±0.5%, or ±0.1% from the specified value, as such variations are appropriate to perform the disclosed methods.

The term "harvester" as used herein is defined as a machine that consolidates and/or packages material so as to facilitate the storage and handling of the material for later use. In some embodiments, the harvester is used to harvest agricultural material. In some embodiments, the harvester is an agricultural baler, a waste baler, or a combine comprising a baling mechanism. In some embodiments, the harvester is a round baler.

The term "material" as used herein is defined as a numerous individual items that are harvested or collected by the harvester. In some embodiments, the material is agricultural crop, such as hay or silage. In some embodiments, the material is biomass.

The term "pickup assembly" as used herein is defined as an element responsible for collecting material from the ground over which the harvester operates. A harvesting assembly includes a mechanism to pick up the material from the ground, and such mechanisms are well known in the agricultural industry. Reference is made, for example, to U.S. Patent Application No. US20130305683, which is incorporated herein by reference in its entirety, that illustrates such mechanisms.

As used herein, the term "roll" or "roller" are used interchangeably to mean a substantially cylindrical member that rotates about an axis. In some embodiments, the rolls are components of the serpentine system and run longitudinally and/or transversely across the width of the agricultural harvester or system and support one or a plurality of baling belts that convey harvested crop material in the harvester or system while the harvester or system is in operation.

The term "bale chamber" as used herein is defined as any space within the harvester that is capable of forming a bale of harvested material. In some embodiments, the sides of the bale chamber are defined by oppositely facing side walls and the bottom of the bale chamber is defined by at least one floor roll that spans transverse to the sidewalls and that partially supports the weight of the bale in the bale chamber. In some embodiments, the bale chamber is also defined in its front region by an inlet through which harvested material or crop enters. In some embodiments, the front region of a first bale chamber is defined by an inlet or entry point which is in operable connection to a throat of a crop harvesting assembly, such as a pickup or rotary cutter, and which is defined in a space between the first sidewall, the second sidewall, the bale carrier, and a plurality of rollers positioned between and attached to the first and second sidewalls; wherein the plurality of rollers support one or more baling belts. In some embodiments, at least one, at least two, at least three, or at least four floor rollers extend transverse to the oppositely positioned sidewalls along the bottom and front of the bale chamber, wherein at least one roller is adjacent to the top and bottom of the entry point. In some embodiments, a bale carrier is positioned in and defines the back of the bale chamber by obstructing an outlet in it fully closed position. In some embodiments, the rollers extending beyond the side walls allow the width of the bale chamber to be selectively increased. In some embodiments, side walls which can be moved laterally, i.e., in the direction of the width of the round baler, that enable making bales of different width or the friction between the walls and bale to be reduced when ejecting the bale. In some embodiments, the top portion of the bale chamber is define by the position of one or more baling belts that wrap around a top portion of the crop material as its rotating in the bale chamber. In some embodiments, the baling belts are mounted on a series of rolls positioned above the bale chamber that exact tension on a the bale as it grows.

The term "wrapping mechanism" as used herein is defined as a mechanical device or assembly that uses wrapping material to wrap a formed bale.

The term "wrapping material" as used herein is defined as a net, mesh, twine, plastic film, or other material that is used for the wrapping of a bale in order to maintain the shape and density of said bale and optionally protect it from weather or other external conditions.

The term "material support cylinder" as used herein is defined as an elongated member, including, for example, a rod or tube configured for supporting a roll of wrapping material. In some embodiments, the roll of wrapping material is capable of rotating about the material support cylinder on the material support cylinder axis. In some embodiments, the material support cylinder is capable of pivoting away from a sidewall. In some embodiments, the material support cylinder is capable of pivoting away from the axis upon which the roll of wrapping material rotates when the material support cylinder is in its net wrapping position. In some embodiments, the material support cylinder is capable of pivoting away from a sidewall to a position where a roll of wrapping material may be loaded or unloaded from the material support cylinder. In some embodiments, the material support cylinder is not operably connected to a ramp-shaped lifting member or another type of member that can engage with a brake pad, brake arm, or another member of a brake system.

Many of the fastening, connection, processes and other means and components utilized in this disclosure are widely known and used in the field of the disclosure described, and their exact nature or type is not necessary for an understanding and use of the disclosure by a person skilled in the art, and they will not therefore be discussed in significant detail. Furthermore, the various components shown or described herein for any specific application of this disclosure can be varied and the practice of a specific application of any element may already be widely known or used in the art by persons skilled in the art and each will likewise not therefore be discussed in significant detail.

Agricultural harvesters, such as round balers, are well known in the agricultural industry, and the instant disclosure can be used with substantially any of such machines. Reference is made, for example, to U.S. Pat. Nos. 6,877,304; 6,688,092; 6,644,006 and 6,295,797 that illustrate such harvesters, the disclosures of which are incorporated herein by reference in their entirety. Embodiments of the present disclosure are particularly well suited, but in no way limited to, use with agricultural balers. The present disclosure may also find utility in agricultural harvesters including, for example, a round baler, a waste baler, a cotton harvester, or a combine. In some embodiments, the combine comprises a baling mechanism.

The present disclosure relates to a lever plate system comprising a handle that allows an operator to pull the handle to unlock a mechanism designed to prevent movement of a material support cylinder from its position during operation. The lever plate system facilitates loading and reloading of wrapping material in the harvester. By pulling on the handle, a lever plate rotates to both expose the opening where the material support cylinder sits during operation of the harvester, and to push the material support cylinder out of said opening. Upon moving a material support cylinder from a locked position, the operator can remove spent wrapping material tubes and replace them with new rolls of wrapping material. This represents an improvement over prior lever plate systems which only exposed the opening where the material support cylinder sits, forcing the operator to manually move the material support cylinder.

In some embodiments, the present disclosure relates to a harvester comprising: at least one bale chamber; a pair of oppositely positioned sidewalls defining lateral sides of the at least one bale chamber; a wrapping mechanism comprising at least one material support cylinder positioned within or proximate to the at least one bale chamber; and a lever plate system, positioned adjacent to the wrapping mechanism and configured for operation in at least one closed position and at least two open positions, such lever plate system comprising: at least one support plate, operably connected to at least one sidewall, comprising a support notch positioned at or approximately at the forward edge of the support plate, capable of supporting the at least one material support cylinder; a lever plate, configured for at least two open positions and at least one closed position and operably attached to the support plate at a first pivot point, comprising a blocker section and a pusher section; wherein the blocker section of the lever plate occludes at least a portion of the support notch in a closed position and exposes at least a portion of the support notch in at least a first open position; and wherein the support notch is free of at least a portion of the pusher section in the closed position and occupied by at least a portion of the support notch in at least a second open position; and at least one spring, operably connected to the at least one lever plate and the at least one sidewall. The harvester is configured for occluding in one or more closed positions and exposing the support notch in one or more open positions, such lever plate system comprising: a closed position in which the blocker section of the lever plate occludes the opening in the support notch, such that the material support cylinder contained in the support notch is prevented from pivoting away from the support plate; a first open position in which the blocker section of the lever plate exposes the opening in the support notch, such that the material support cylinder contained in the support notch is capable of pivoting away from the support plate; and a second open position in which the blocker section of the lever plate exposes the opening in the support notch and the pusher section of the lever plate occupies a position in the support notch, such that a material support cylinder pivots away from the support plate.

Figure 1:
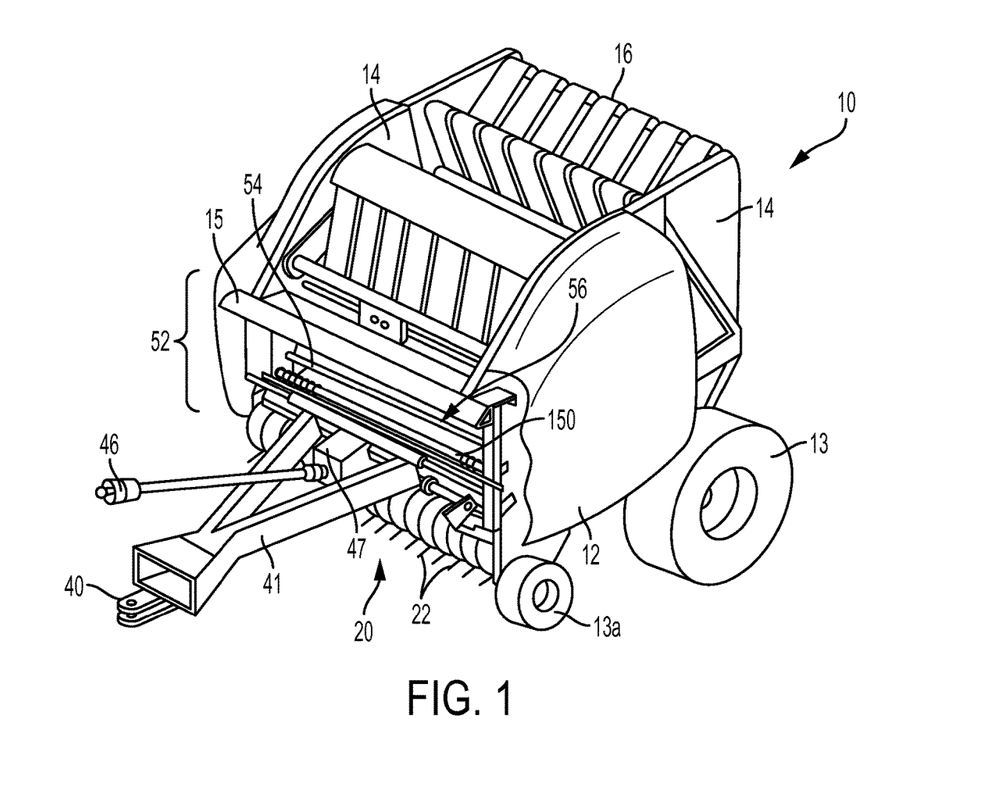
FIG. 1 depicts a static image of a baler.

Referring to the figures, FIG. 1 depicts an example of a round baler. The round baler, generally designated 10 is enclosed by a main frame 12, comprising a plurality of rigid structural elements including a pair of side walls 14. Main frame 12 is supported by a pair of rear wheels 13. A forwardly mounted hitch 40, integrated with the main frame 12, provides for connection to a tractor, for examples. As shown, a power take off (PTO) shaft 46, is located herein about the hitch 40. In other balers, the PTO shaft may be located and connected to the tractor below the hitch. The PTO shaft draws energy from a tractor driving the hitch and transfer that energy to drive mechanisms in the baler 10. Rear side 16, typically comprises a tailgate what is closed during bailing and opened to eject finished bales. In conventional balers, storage to house spare rolls of wrapping material is typically located about the tailgate. The front side 15 of the baler faces the rear of a tractor as connected to by the hitch 40 and the PTO shaft 46. At the bottom of the front side, between a front pair of wheels 13a, and mounted to the mainframe 12, is the pickup 20. The pickup 20 is supported by the pair of front wheels 13a. Pickup tines 22 wrap around and connect within the pickup 20. The tips of the tines 22 are movable along a predetermined path along the ground to lift crop material from the ground and deliver it rearward along a generally horizontal path towards a floor roll (not shown) at the bottom of the later, which is rotatably mounted on main frame 12. During baling, the floor roll conveys crop material further rear into a bale chamber where belts then urge the material upwardly and forwardly into engagement with sledge rolls. The sledge rolls coil crop material in a round direction to form and add to a bale acre. Continued feeding by pick tines 22 urge additional crop material into the forming bale in a generally spiral fashion growing the bale core. A wrapping assembly 52 comprises an active roll cavity 54. When the baler is in use, the active roll cavity 54 would house a roll of wrapping material which would spin around a material support cylinder 150 as wrapping material is fed into a feeding entry 56.

Figure 2:
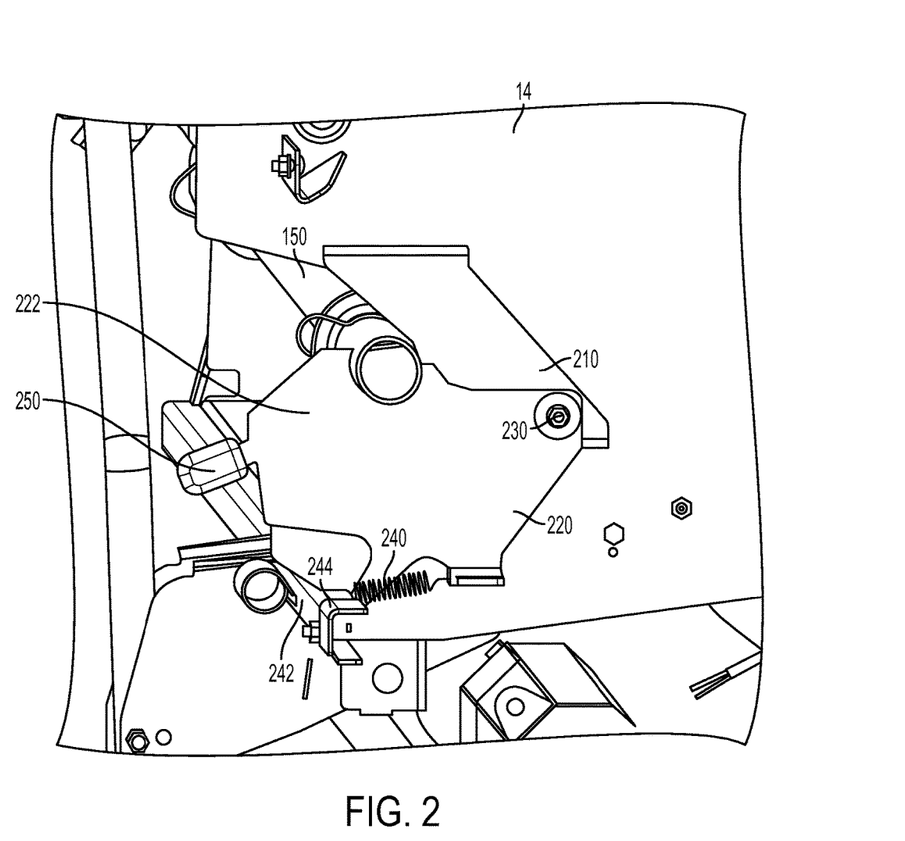
FIG. 2 depicts a conventional lever plate system, with a material support cylinder in a locked position.

FIG. 2 depicts an example of a conventional lever plate system, which keeps the material support cylinder 150 into locked position where wrapping material can be fed into the feeding entry (not shown in this figure). A support plate 210 is attached to one of the sidewalls 14, and physically supports one end of the material support cylinder 150 in a support notch. Keeping the material support cylinder 150 in the support notch is the lever plate 220, which is connected to the support plate 210 by a pivot point 230. The lever plate 220 is held in position by a spring 240 which is attached to a cross member 242 by a bracket 244. To move the material support cylinder 150 out of the support notch, for example, to load, unload, or reload a roll of wrapping material, an operator would pull down on a handle 250. The lever plate 220 would rotate around the pivot point 230, such that a blocker section 222 of the lever plate 210 exposes an opening in the support notch, allowing the operator the manually pivot the material support cylinder 150 away from the support notch, support plate 210, and sidewall 14. When the operator releases the handle 250, the spring 240 pulls the lever plate 220 back to the starting position.

Figure 3:
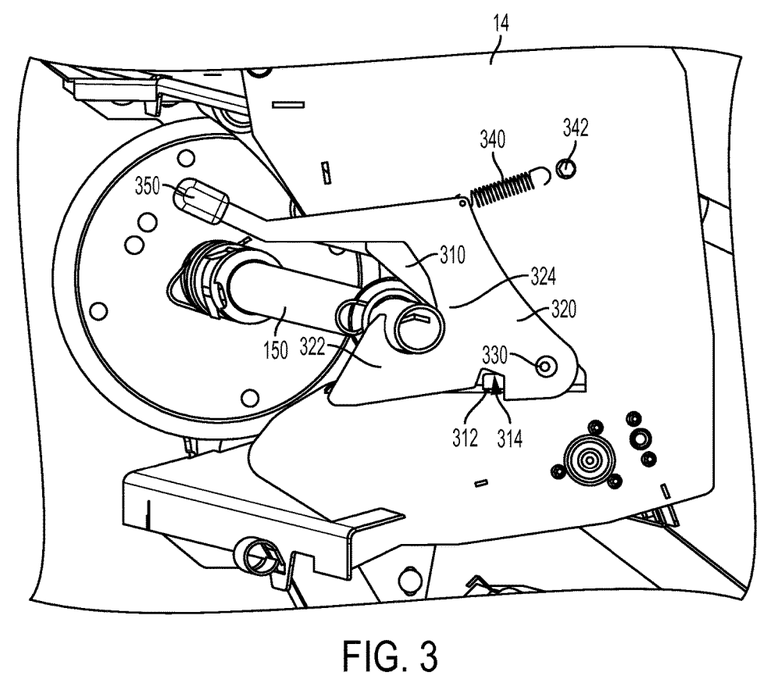
FIG. 3 depicts a lever plate system, with a material support cylinder in a locked position.

FIG. 3. depicts the lever plate system of the present disclosure. A support plate 310 is attached to one of the sidewalls 14, and physically supports one end of the material support cylinder 150 in a support notch. Keeping the material support cylinder 150 in the support notch is the lever plate 320, which is connected to the support plate 310 by a pivot point 330. The lever plate 320 is held in position by a spring 340 which is attached directly to the sidewall 14 at a connection point 342. Also defining the position of the lever plate 320 is a stop tab 312 of the support plate 310, which contacts one edge of a stop notch 314 in the lever plate 320, preventing further rotation of the lever plate 320 around the pivot point 330. To move the material support cylinder 150 out of the support notch, for example, to load, unload, or reload a roll of wrapping material, an operator would pull down on a handle 350. The lever plate 320 would rotate around the pivot point 330, such that a blocker section 322 of the lever plate 320 exposes an opening in the support notch. Furthermore, a pusher section 324 of the lever plate 320 moves into the support notch, making contact with the material support cylinder 150, such that the material support cylinder 150 is pushed out of the support notch.

Figure 4A:
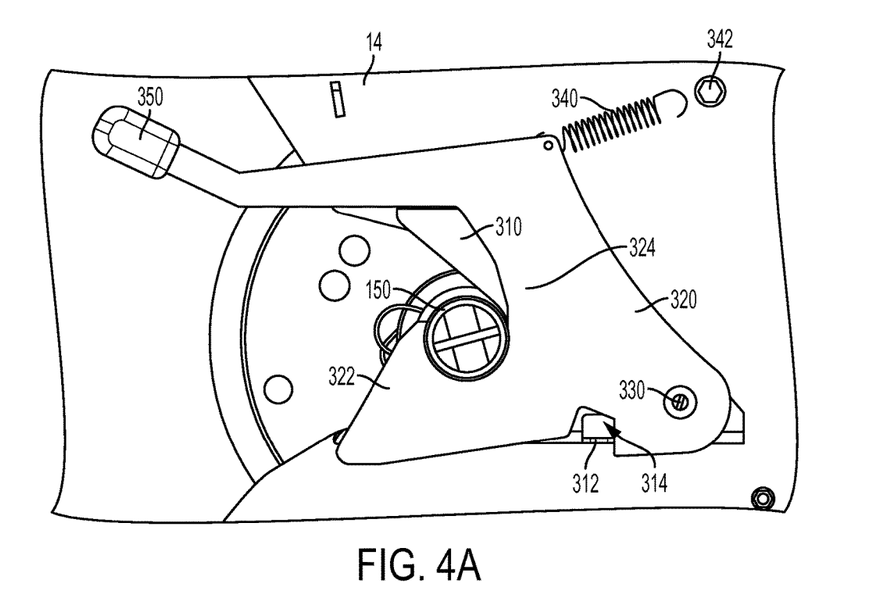
FIGS. 4A-4E depict a lever plate system at various stages during the unlocking of a material support cylinder.
Figure 4B:
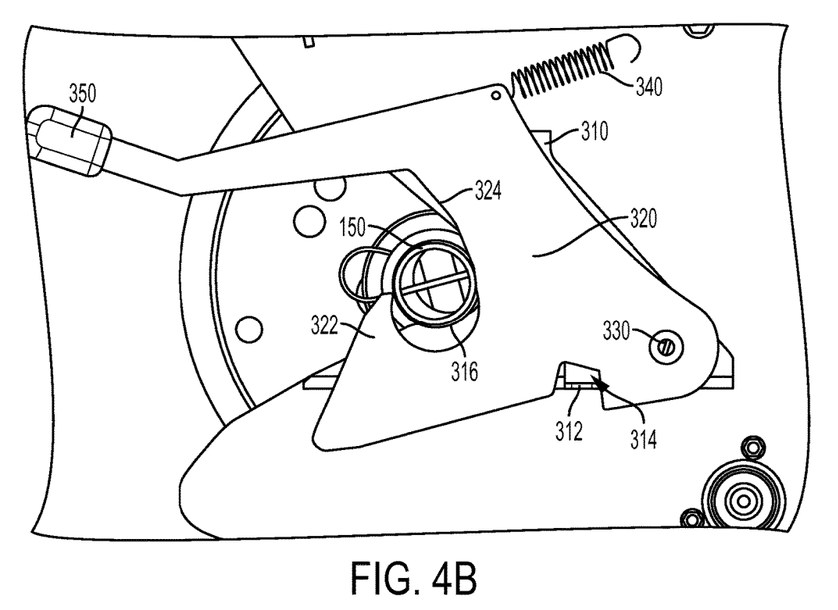
Figure 4C:
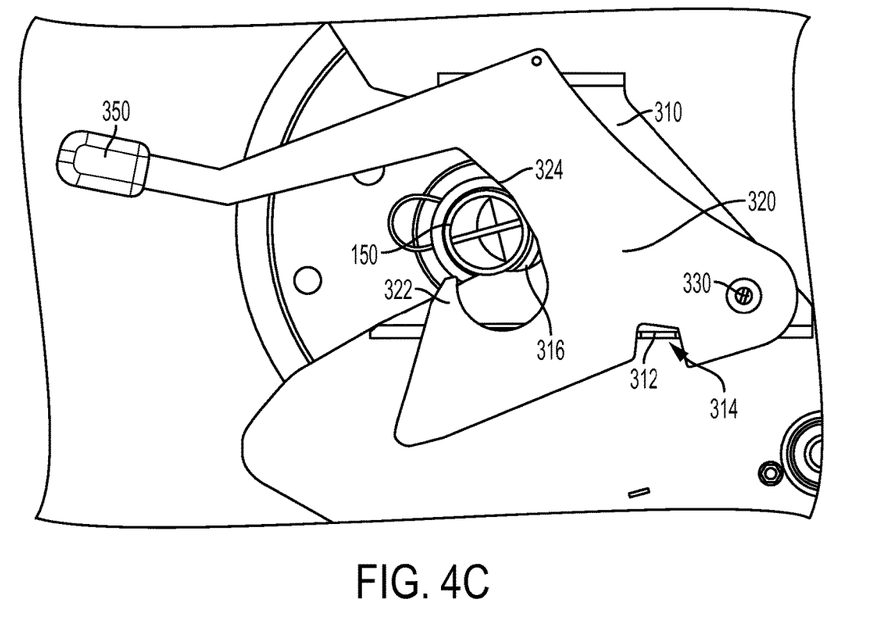
Figure 4D:
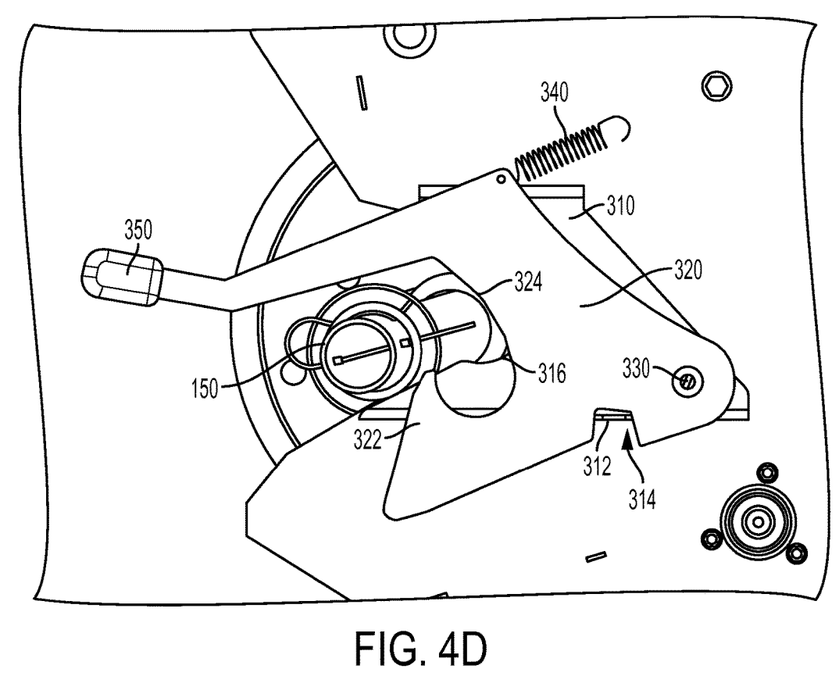
Figure 4E:
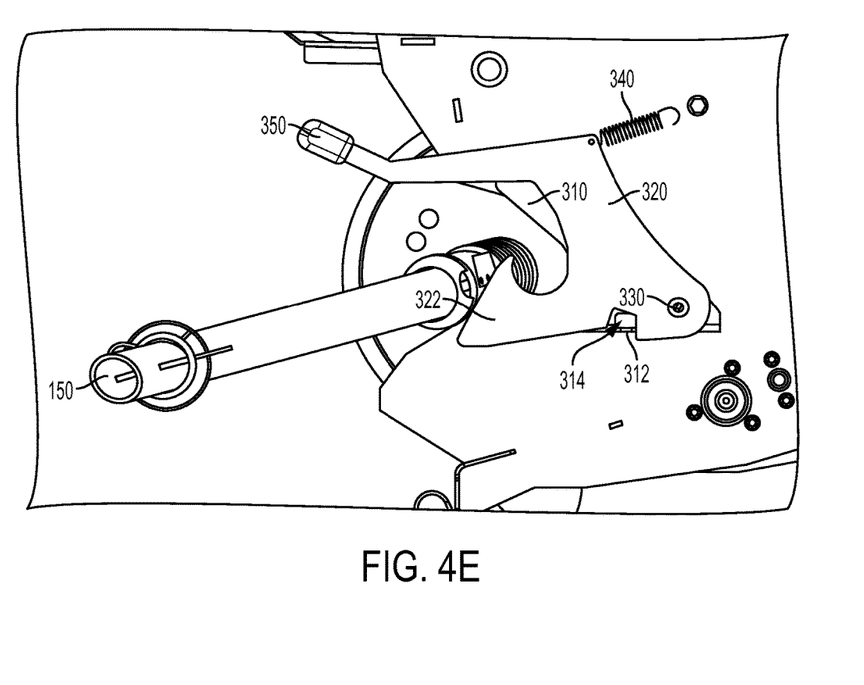

This process is illustrated in more detail in FIGS. 4A-4E. It is understood that the components of the lever plate system function in a serial, stepwise or simultaneous fashion but that all steps described in FIGS. 4A, 4B, 4C, 4D, and 4E illustrate one embodiment of the activation of the lever plate system for purposes of the disclosure. The lever plate 320 is in the starting position in FIG. 4A, with the blocker section 322 keeping the material support cylinder 150 in the support notch of the support plate 310. As an operator pulls down on the handle 350 with enough force to overcome the resistance of the spring 340, the lever plate begins to rotates around the pivot point 330 as shown in FIG. 4B. The blocker section 322 of the lever plate 310 begins to pull away, exposing an opening in the support notch 316 of the support plate 310. Simultaneously, the pusher section 324 of the lever plate 320 begins to move down toward the support notch 322. In FIG. 4C the lever plate 320 continues its rotation, with the blocker section 322 now completely exposing the opening in the support notch 316. As the pusher section 324 enters into the support notch 312 it makes contact with the material support cylinder 150, forcing it to move out of the now open support notch 312. In FIG. 4D, the lever plate 320 has reached its maximum downward or open position. Additional movement is prevented by the stop tab 312 of the support plate 310, which comes in contact with an edge of the stop notch 314 of the lever plate 320. The material support cylinder 150 is now completely out of the support notch 316 and is pivoting towards a position where an operator can load or unload a roll of wrapping material. In FIG. 4E, the operator has released the handle 350 of the lever plate 320, and the spring 340 pulls the lever plate 320 back to its original position. The material support cylinder 150 is now finished pivoting and is in its load/unload position.

Having described a series of embodiments, it will become apparent that various modifications can be made without departing from the scope of the disclosure as defined in the accompanying claims. Various publications, including patents, published applications, technical articles and scholarly articles are cited throughout the specification. Each of these cited publications and patent applications is incorporated by reference herein in its entirety.

What is claimed is:

1. A lever plate system comprising:
   a support plate, operably connected to a harvester sidewall, comprising a support notch configured for support of a material support cylinder;
   a lever plate, configured for at least two open positions and at least one closed position and operably attached to the support plate at a first pivot point, the lever plate comprising a blocker section and a pusher section; wherein the blocker section of the lever plate occludes at least a portion of the support notch in a closed position and exposes at least a portion of the support notch in at least a first open position; and wherein the support notch is free of at least a portion of the pusher section in the closed position and occupied by at least a portion of the pusher section in at least a second open position, the pusher section contacting the material support cylinder in at least the second open position to force the material support cylinder out of the support notch; and
   a spring, operably connected to the lever plate and the harvester sidewall.

2. The lever plate system of claim 1, wherein an edge of the pusher section of the lever plate is defined by a concave curvature, such concave curvature contacting the material support cylinder in the support notch when the lever plate is in the at least one closed position.

3. The lever plate system of claim 1, wherein the material support cylinder pivots away from the support notch when the lever plate transitions from a closed position to at least one open position.

4. The lever plate system of claim 2, wherein the spring maintains tension between the lever plate and the harvester sidewall, such that the lever plate is biased toward the closed position.

5. The lever plate system of claim 1, wherein the lever plate further comprises a handle, configured to allow an operator to adjust the lever plate from a closed position to one or a plurality of open positions.

6. The lever plate system of claim 5, wherein the lever plate further comprises a stop notch; and wherein the support plate further comprises a stop tab configured to occupy at least a portion of the stop notch, such that the stop tab limits a maximum range of motion of the lever plate.

7. The lever plate system of claim 6, wherein the stop notch is positioned on the bottom edge of the lever plate.

8. The lever plate system of claim 1, wherein the lever plate is configured for occluding the support notch in one or more closed positions and exposing the support notch in one or more open positions, and wherein the lever plate system further comprises:
   a closed position in which the blocker section of the lever plate occludes the opening in the support notch, such that the material support cylinder contained in the support notch is prevented from pivoting away from the support plate;
   a first open position in which the blocker section of the lever plate exposes the opening in the support notch, such that the material support cylinder contained in the support notch is capable of pivoting away from the support plate; and
   a second open position in which the blocker section of the lever plate exposes the opening in the support notch and the pusher section of the lever plate occupies a position in the support notch, such that a material support cylinder pivots away from the support plate.

9. A harvester comprising:
   at least one bale chamber;
   a pair of oppositely positioned sidewalls defining lateral sides of the at least one bale chamber;
   a wrapping mechanism comprising at least one material support cylinder positioned within or proximate to the at least one bale chamber; and
   a lever plate system, positioned adjacent to the wrapping mechanism and configured for operation in at least one closed position and at least two open positions, such lever plate system comprising:
   at least one support plate, operably connected to at least one sidewall, comprising a support notch positioned at or approximately at the forward edge of the support plate, capable of supporting the at least one material support cylinder;
   a lever plate, configured for at least two open positions and at least one closed position and operably attached to the support plate at a first pivot point, the lever plate comprising a blocker section and a pusher section; wherein the blocker section of the lever plate occludes at least a portion of the support notch in a closed position and exposes at least a portion of the support notch in at least a first open position; and wherein the support notch is free of at least a portion of the pusher section in the closed position and occupied by at least a portion of the pusher section in at least a second open position, the pusher section contacting the material support cylinder in at least the second open position to force the material support cylinder out of the support notch; and at least one spring, operably connected to the at least one lever plate and the at least one sidewall.

10. The harvester of claim 9, wherein an edge of the pusher section of the lever plate is defined by a concave curvature, such concave curvature contacting the material support cylinder in the support notch when the lever plate is in the at least one closed position.

11. The harvester of claim 9, wherein the material support cylinder pivots away from the support notch when the lever plate transitions from a closed position to at least one open position.

12. The harvester of claim 10, wherein the at least one spring maintains tension between the at least one lever plate and the at least one sidewall, such that the at least one lever plate is biased to the closed position.

13. The harvester of claim 9, wherein the at least one lever plate further comprises a handle, configured to allow an operator to move the at least one lever plate from the closed to at least the second open position.

14. The harvester of claim 13, wherein the at least one lever plate further comprises a stop notch; and wherein the at least one support plate further comprises a stop tab, configured to occupy a position in the stop notch, such that the stop tab limits the maximum range of motion of the at least one lever plate.

15. The harvester of claim 9, wherein the lever plate is configured for occluding the support notch in one or more closed positions and exposing the support notch in one or more open positions, and wherein the lever plate system further comprises:
   a closed position in which the blocker section of the lever plate occludes the opening in the support notch, such that the material support cylinder contained in the support notch is prevented from pivoting away from the support plate;
   a first open position in which the blocker section of the lever plate exposes the opening in the support notch, such that the material support cylinder contained in the support notch is capable of pivoting away from the support plate; and
   a second open position in which the blocker section of the lever plate exposes the opening in the support notch and the pusher section of the lever plate occupies a position in the support notch, such that a material support cylinder pivots away from the support plate.

16. The harvester of claim 9, wherein the lever plate further comprises a handle, positioned at or approximately at the upper rear section of the lever plate, configured to allow an operator to move the lever plate from the closed to at least the second open position; wherein the level plate further comprises a stop notch, positioned on the bottom edge of the lever plate; and wherein the at least one support plate further comprises a stop tab comprising a front wall and a rear wall, positioned at the bottom of the support plate, configured to occupy a position in the stop notch in both the closed and open positions, such that the stop tab limits the maximum range of motion of the at least one lever plate by coming in operable contact with the front wall in the at least second open position and by coming in operable contact with the rear wall in the at least one closed position.

17. The harvester of claim 9, wherein the lever plate is configured for occluding and exposing the opening in the support notch in a plurality of positions, the lever plate system further comprising:
   a closed position whereby the blocker section of the lever plate occludes the opening in the support notch and the pusher section of the lever plate does not occupy a position in the support notch, such that a material support cylinder contained in the support notch is prevented from pivoting away from the support plate;
   a first open position whereby the blocker section of the lever plate exposes the opening in the support notch and the pusher section of the lever plate does not occupy a position in the support notch, such that a material support cylinder contained in the support notch is not prevented from pivoting away from the support plate; and
   a second open position whereby the blocker section of the lever plate exposes the opening in the support notch and the pusher section of the lever plate occupies a position in the support notch, such that a material support cylinder pivots away from the support plate.

18. A method of moving a material support cylinder from a locked position to a load position in the harvester of claim 9, the method comprising adjusting the position of the lever plate from a closed position to a fully open position.

19. The method of claim 18, wherein the step of adjusting the position of the lever plate comprises moving the handle radially from its position in the closed position.

20. A method of reloading wrap material in a harvester of claim 9, said method comprising:
   (a) adjusting the position of the lever plate from a closed position to an open position;
   (b) disengaging the stop tab from the support notch;
   (c) allowing the material support cylinder to pivot away from the support plate;
   (d) removing wrapping material from the material support cylinder; and
   (e) placing a new roll of wrapping material on the material support cylinder.

21. The method of claim 20 further comprising adjusting the position of the lever support plate from at least a first open position to a closed position after the step of placing a new roll of wrapping material on the material support cylinder such that, in the closed position, the material support cylinder is positioned within the support notch.

\* \* \* \* \*